(12) United States Patent
Park et al.

(10) Patent No.: US 11,303,001 B2
(45) Date of Patent: Apr. 12, 2022

(54) BATTERY CELL INCLUDING ELECTRODE LEAD LOCATED SO AS TO FACE OUTER SURFACE OF ELECTRODE ASSEMBLY

(71) Applicant: LG Chem, Ltd., Seoul (KR)

(72) Inventors: Jong-Pil Park, Daejeon (KR); Geun-Chang Chung, Daejeon (KR); Yo-Han Ko, Daejoen (KR)

(73) Assignee: LG Energy Solution, Ltd.

( * ) Notice: Subject to any disclaimer, the term of this patent is extended or adjusted under 35 U.S.C. 154(b) by 201 days.

(21) Appl. No.: 16/321,721

(22) PCT Filed: Dec. 21, 2017

(86) PCT No.: PCT/KR2017/015179
§ 371 (c)(1),
(2) Date: Jan. 29, 2019

(87) PCT Pub. No.: WO2018/135764
PCT Pub. Date: Jul. 26, 2018

(65) Prior Publication Data
US 2020/0127269 A1    Apr. 23, 2020

(30) Foreign Application Priority Data
Jan. 18, 2017 (KR) .......................... 10-2017-0008355

(51) Int. Cl.
*H01M 50/54* (2021.01)
*H01M 50/20* (2021.01)
(Continued)

(52) U.S. Cl.
CPC ......... *H01M 50/54* (2021.01); *H01M 50/124* (2021.01); *H01M 50/20* (2021.01); *H01M 50/531* (2021.01)

(58) Field of Classification Search
CPC .... H01M 50/54; H01M 50/124; H01M 50/20; H01M 50/531
See application file for complete search history.

(56) References Cited

U.S. PATENT DOCUMENTS 8,920,958 B2    12/2014    Tatebayashi et al.
10,340,498 B2    7/2019    Oh et al.
(Continued)

FOREIGN PATENT DOCUMENTS

JP    2002025513 A    1/2002
JP    2002042772 A    2/2002
(Continued)

OTHER PUBLICATIONS

Extended European Search Report including Written Opinion for Application No. EP17892214.2, dated Sep. 23, 2019, pp. 1-6.
(Continued)

*Primary Examiner* — Milton I Cano
*Assistant Examiner* — Jenna Shulman
(74) *Attorney, Agent, or Firm* — Lerner, David, Littenberg, Krumholz & Mentlik, LLP (57) ABSTRACT

A battery cell has an electrode assembly, including a positive electrode and a negative electrode stacked in the state in which a separator is interposed between the positive electrode and the negative electrode, is mounted in a pouch-shaped cell case, wherein electrode tabs protruding outwards from a plurality of electrode plates are coupled to a first lead end of an electrode lead, a second lead end of the electrode lead, which is an opposite end to the first lead end, is located on the outer surface of the cell case in the state of being parallel to the direction in which the electrode plates are stacked, and a lead body provided between the first lead end and the second lead end is located to face the outermost surface of the electrode assembly in the state of being
(Continued)

maintained parallel to the direction in which the electrode plates are stacked.

14 Claims, 4 Drawing Sheets

(51) Int. Cl.
   *H01M 50/124*   (2021.01)
   *H01M 50/531*   (2021.01)

(56) References Cited

U.S. PATENT DOCUMENTS

| | | |
|---|---|---|
| 2004/0121231 A1 | 6/2004 | Kim |
| 2006/0019156 A1 | 1/2006 | Kim |
| 2007/0196732 A1 | 8/2007 | Tatebayashi et al. |
| 2010/0047687 A1 | 2/2010 | Lee et al. |
| 2012/0121965 A1* | 5/2012 | Makino ............... H01M 4/70 429/156 |
| 2013/0280569 A1 | 10/2013 | Mori et al. |
| 2015/0072204 A1* | 3/2015 | Kwon ............... H01M 10/0436 429/94 |
| 2017/0214028 A1 | 7/2017 | Oh et al. |
| 2018/0090737 A1 | 3/2018 | Sawanishi et al. |

FOREIGN PATENT DOCUMENTS

| | | |
|---|---|---|
| JP | 2007227090 A | 9/2007 |
| JP | WO2016157370 A1 | 1/2018 |
| KR | 20040054128 A | 6/2004 |
| KR | 20060033643 A | 4/2006 |
| KR | 20070096651 A | 10/2007 |
| KR | 20120136718 A | 12/2012 |
| KR | 20160042798 A | 4/2016 |
| KR | 20160131627 A | 11/2016 |
| KR | 20160147366 A | 12/2016 |
| WO | 2016157370 A1 | 10/2016 |

OTHER PUBLICATIONS

International Search Report for PCT/KR2017/015179 dated Apr. 20, 2018.

* cited by examiner

Prior Art

BATTERY CELL INCLUDING ELECTRODE LEAD LOCATED SO AS TO FACE OUTER SURFACE OF ELECTRODE ASSEMBLY

CROSS-REFERENCE TO RELATED APPLICATIONS

The present application is a national phase entry under 35 U.S.C. § 371 of International Application No. PCT/KR2017/015179, filed Dec. 21, 2017, which claims priority to Korean Patent Application No. 10-2017-0008355, filed Jan. 18, 2017 in the Republic of Korea, the disclosures of which are incorporated herein by reference.

TECHNICAL FIELD

The present invention relates to a battery cell including an electrode lead located so as to face the outer surface of an electrode assembly.

BACKGROUND ART

The rapid increase in the use of fossil fuels has accelerated the demand for alternative energy sources or clean energy sources, and research has been actively carried out into power generation and power storage using electrochemistry.

A typical example of an electrochemical device using such electrochemical energy is a secondary battery, which has been increasingly used in various fields.

As portable devices, such as portable computers, portable phones, and cameras, have been increasingly developed and the demand for such mobile devices has increased in recent years, the demand for secondary batteries as energy sources for such mobile devices has also sharply increased. Among such secondary batteries is a lithium secondary battery that exhibits high charge and discharge characteristics, exhibits long lifespan characteristics, and is environmentally friendly, into which much research has been carried out and which is now commercialized and widely used.

An electrode assembly, which is mounted in a battery case, is a power-generating element that has a structure in which a positive electrode, a separator, and a negative electrode are stacked and that can be charged and discharged. The electrode assembly is classified as a jelly-roll type electrode assembly, which is configured to have a structure in which a long sheet type positive electrode and a long sheet type negative electrode, to which active materials are applied, are wound in the state in which a separator is disposed between the positive electrode and the negative electrode, or a stacked type electrode assembly, which is configured to have a structure in which a plurality of positive electrodes having a predetermined size and a plurality of negative electrodes having a predetermined size are sequentially stacked in the state in which separators are disposed respectively between the positive electrodes and the negative electrodes.

There has been developed a stacked/folded type electrode assembly having an improved structure, which is a combination of the jelly-roll type electrode assembly and the stacked type electrode assembly. The stacked/folded type electrode assembly is configured to have a structure in which a plurality of full cells, each of which has a positive electrode/separator/negative electrode structure and has a predetermined unit size, are arranged, or a plurality of bi-cells, each of which has a positive electrode (or negative electrode)/separator/negative electrode (or positive electrode)/separator/positive electrode (or negative electrode) structure and has a predetermined unit size, are arranged, is folded using a long continuous separation film.

Meanwhile, the lithium secondary battery, which is one of the secondary batteries, has lower weight and higher energy density than other secondary batteries, and thus the demand for the lithium secondary battery is on an increasing trend. In particular, for a prismatic battery, the volume of electrode tabs that protrude outwards from an electrode assembly, in which a plurality of electrode plates and a plurality of separators are stacked, and the volume of an electrode lead that protrudes outwards in the state of being connected to the electrode tabs excessively increase the volume of a secondary battery, whereby the energy density of the secondary battery is reduced. Furthermore, unnecessary dead space is formed in a device in which the secondary battery mounted.

Figure 1:
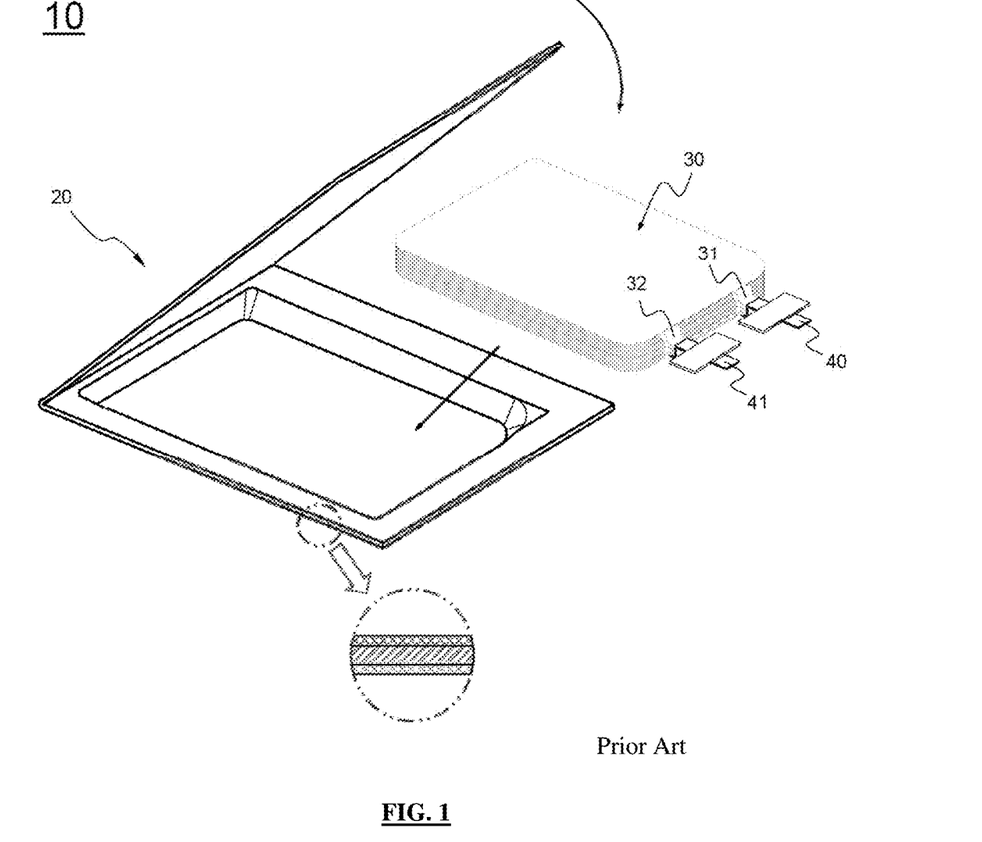
FIG. 1 is an exploded perspective view of a conventional general pouch-shaped battery cell including a stacked type electrode assembly.

FIG. 1 is an exploded perspective view schematically showing a conventional general pouch-shaped battery cell including a stacked type electrode assembly.

Referring to FIG. 1, the pouch-shaped battery cell, which is denoted by reference numeral 10, is configured to have a structure in which an electrode assembly 30 is mounted in a pouch-shaped battery case 20, in which electrode tabs 31 and 32 of the electrode assembly are welded to two electrode leads 40 and 41, respectively, and in which the battery case 20 is sealed in the state in which the electrode leads are exposed outwards from the battery case. The electrode leads are located in the direction in which the electrode tabs protrude. The capacity of the battery cell is reduced by the tab-lead coupling portions and the electrode leads, whereby the total energy capacity of the battery cell is reduced.

In order to solve these problems, batteries having various novel structures have been introduced in recent years. However, the introduced batteries still do not satisfactorily solve the above problems. For this reason, the demand for a battery suitable for miniaturization of a device while having improved energy density is being continued.

Therefore, there is an urgent necessity for technology that is capable of fundamentally solving the above problems.

DISCLOSURE

Technical Problem

The present invention has been made to solve the above problems and other technical problems that have yet to be resolved.

As a result of a variety of extensive and intensive studies and experiments to solve the problems described above, the inventors of the present application have found that, in the case in which one end of an electrode lead is coupled to electrode tabs and in which a lead body of an electrode lead is located so as to face the outermost surface of an electrode assembly in the state of being parallel to a plurality of electrode plates such that an opposite end of the electrode lead is located on the outer surface of a cell case, as will be described below, the electrode lead does not protrude outwards from the electrode assembly. It is possible to reduce the size of unnecessary dead space of the battery cell that is occupied by a tab-lead coupling portion and the electrode lead and to improve the utilization of the inner space of a device in which the battery cell is mounted. The present invention has been completed based on these findings.

Technical Solution

In accordance with an aspect of the present invention, the above and other objects can be accomplished by the provision of a battery cell configured such that an electrode assembly, including a positive electrode and a negative electrode stacked in the state in which a separator is interposed between the positive electrode and the negative electrode, is mounted in a pouch-shaped cell case, wherein electrode tabs protruding outwards from a plurality of electrode plates are coupled to a first lead end of an electrode lead, a second lead end of the electrode lead, which is an opposite end to the first lead end, is located on the outer surface of the cell case in the state of being parallel to the electrode plates, and a lead body provided between the first lead end and the second lead end is located so as to face the outermost surface of the electrode assembly in the state of being maintained parallel to the electrode plates.

In a conventional electrode assembly, the electrode tabs and a tab-lead coupling portion protrude to occupy a predetermined volume of the battery cell, whereby space that does not contribute to the improvement in the capacity of a secondary battery is formed in the battery cell.

In contrast, in the electrode assembly according to the present invention, the size of the space that is occupied by the electrode tabs and the tab-lead coupling portion, which do not contribute to the improvement in the capacity of the secondary battery, is reduced, whereby it is possible to considerably improve the energy density of the secondary battery.

In a concrete example, the electrode lead may be configured such that, in the state in which the second lead end, the lead body, and the first lead end are arranged so as to be sequentially located in the state of being parallel to the direction in which the electrode tabs protrude outwards, the first lead end is coupled to the electrode tabs, and a portion of the lead body is bent at an angle of 180 degrees with respect to a remaining portion of the lead body such that the second lead end is located on the outer surface of the cell case.

In addition, the electrode lead may be configured such that, in the state in which the lead body and the first lead end are arranged so as to be sequentially located in the state of being parallel to the direction in which the electrode tabs protrude outwards, the first lead end is coupled to the electrode tabs, and an auxiliary lead, which forms the second lead end, is further coupled to the lead body.

Specifically, the auxiliary lead may be connected to the lead body by welding, and may be made of a metal material so as to function as a lead.

Meanwhile, a coupling portion of the electrode tabs and the first lead end may be bent at an angle of 90 degrees with respect to the lead body so as to face the side surface of the electrode assembly.

Since the coupling portion of the electrode tabs and the first lead end is bent so as to face the side surface of the electrode assembly, the size of an unnecessary space formed in a structure in which the electrode tabs and the electrode lead protrude outwards from the electrode assembly may be effectively reduced. The coupling portion of the electrode tabs and the first lead end is not necessarily bent at an angle of 90 degrees. The coupling portion of the electrode tabs and the first lead end may be bent at an angle of 75 to 105 degrees toward the side surface of the electrode assembly on the basis of the direction in which the electrode tabs protrude. In the case in which the coupling portion of the electrode tabs and the first lead end is excessively bent toward the side surface of the electrode assembly, however, the electrode tabs may come into contact with the side surfaces of the electrode plates, whereby a short circuit may occur and thus the safety of the battery cell may be reduced.

For this reason, it is sufficient for the electrode lead to exhibit enough strength to remain bent even when external impact is applied thereto. A protective member may be disposed between the bent electrode tabs and the side surface of the electrode assembly.

Meanwhile, the electrode lead according to the present invention may be manufactured by bending a single flat lead or by welding two separate leads. In addition, the electrode lead according to the present invention may be manufactured using a mold having a shape corresponding to the shape of the electrode lead.

Since the electrode lead is located on the surface of the electrode assembly so as to face the outermost surface of the electrode assembly in the state of being maintained parallel to the electrode plates, as described above, the electrode assembly according to the present invention does not have a structure in which the electrode lead protrudes outwards from the electrode assembly, whereby the size of unnecessary dead space may be reduced. In addition, the portion of the electrode lead that is connected to the electrode tabs is bent toward the side surface of the electrode assembly, whereby it is possible to considerably reduce the volume of the battery cell while maintaining the same capacity. Furthermore, in the case in which a battery module is manufactured using battery cells according to the present invention, as will be described below, it is not necessary to perform a welding process for interconnecting the battery cells, and therefore it is possible to simply manufacture the battery module. Consequently, the present invention is advantageous in terms of the manufacturing cost and the manufacturing process.

Specifically, the size of the second lead end may be equivalent to 10% to 95% of the planar size of the outer surface of the cell case, on which the second lead end is located.

The second lead end is substantially a portion for electrical connection with an external device. As the size of the second lead end that is exposed to the outside is increased within the above range, the resistance of the battery cell is decreased.

Meanwhile, the cell case may be made of a laminate sheet including a metal layer and a resin layer, and the outer edge of the cell case may be sealed by thermal fusion. Specifically, one end of the laminate sheet is interposed and fixed between distal portions of the electrode assembly and the lead body that face each other, and the opposite end of the laminate sheet is interposed and fixed between the second lead end and the lead body, whereby the laminate sheet wraps the electrode assembly. The remaining ends of the laminate sheet, which are not fixed by the electrode lead, are sealed by thermal fusion to form the cell case.

In the battery cell according to the present invention, the separator may be interposed between the lead body and the outermost surface of the electrode assembly. Specifically, a stacked/folded type electrode assembly may be configured such that a separator sheet for winding the electrodes is interposed between the lead body and the outermost surface of the electrode assembly, and a stacked type electrode assembly may be configured such that a separator is further disposed on the outermost electrode plate.

According to the present invention, the electrode tabs and the electrode lead may be used for a positive electrode or a negative electrode. In a concrete example, positive electrode tabs of the electrode assembly may protrude outwards in a first direction while negative electrode tabs of the electrode assembly may protrude outwards in a second direction, which is opposite the first direction, a second lead end of a positive electrode lead coupled to the positive electrode tabs may be located on a first outer surface of the cell case, and a second lead end of a negative electrode lead coupled to the negative electrode tabs may be located on a second outer surface of the cell case, which is opposite the first outer surface. Consequently, the positive electrode lead end and the negative electrode lead end are located on different outer surfaces of the electrode assembly.

In accordance with another aspect of the present invention, there is provided a battery module including two or more battery cells according to the present invention. The size of the dead space that is occupied by the electrode tabs and the electrode lead may be reduced, whereby the energy density of the battery cell may be increased. Consequently, the energy density of the battery module including the battery cells may also be increased.

Meanwhile, in the battery module, the battery cells may be arranged in a stacked state so as to have a structure in which the outer surfaces of adjacent cell cases, on which the respective electrode leads of the battery cells are located, face each other. In the structure in which the battery cells are arranged in the stacked state, the electrode leads face each other, whereby the battery cells are electrically connected to each other.

Specifically, in the battery module, the battery cells, which are arranged in the stacked state, may physically contact each other in a non-welding fashion. Since the battery cells are stacked without an additional welding process in order to manufacture the battery module, it is possible to simplify the process of manufacturing the battery module and to reduce the cost of manufacturing the battery module.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 2:
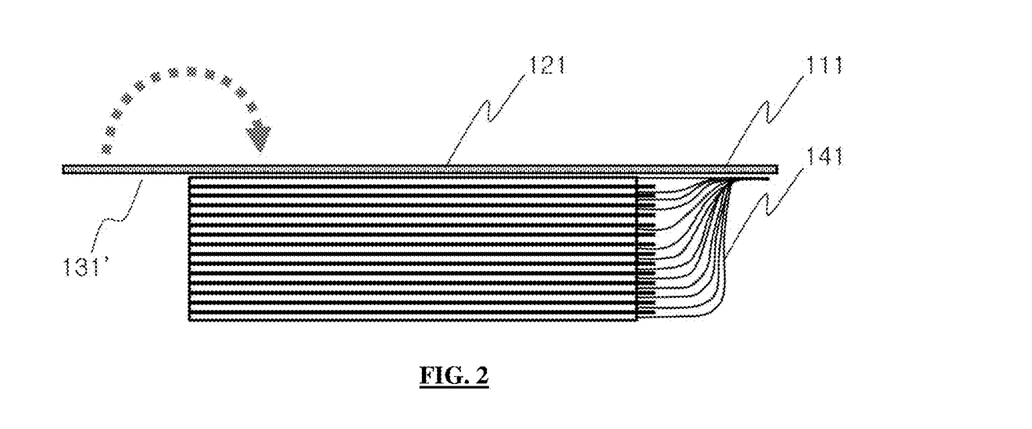
FIG. 2 is a sectional view showing a structure in which an electrode lead is stacked on the outermost surface of an electrode assembly.

FIG. 2 is a sectional view showing a structure in which an electrode lead is stacked on the outermost surface of an electrode assembly.

Referring to FIG. 2, there is shown an electrode lead stacked on the outermost surface of an electrode assembly so as to be parallel to the direction in which electrode plates are stacked. The end of the electrode lead that protrudes in the direction in which electrode tabs 141 of the electrode assembly protrude outwards is a first lead end 111, via which the electrode lead is electrically connected to the electrode assembly. An opposite end 131', which is an end that is opposite the first lead end 111, is bent horizontally at an angle of 180 degrees to form a second lead end, which is located on the outer surface of a cell case.

Figure 3:
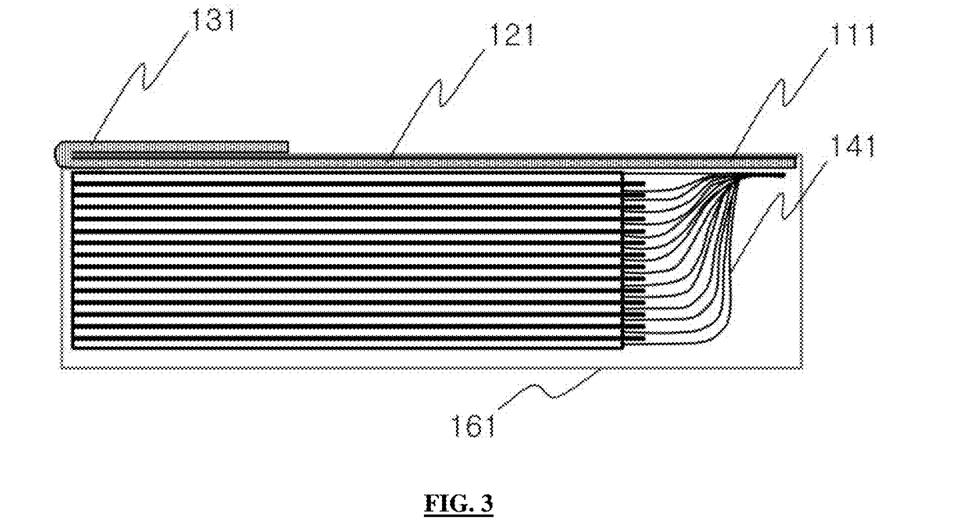
FIG. 3 is a sectional view showing a battery cell configured such that an electrode lead is located so as to face the outer surface of an electrode assembly according to an embodiment of the present invention.

FIG. 3 is a sectional view showing a battery cell configured such that an electrode lead is located so as to face the outer surface of an electrode assembly according to an embodiment of the present invention.

Referring to FIG. 3, there is shown a battery cell configured such that an opposite end 131', which is an end that is opposite a first lead end, is bent horizontally to form a second lead end 131, in the same manner as what is shown in FIG. 2, and such that the second lead end 131 is located so as to face the outermost surface of the electrode assembly in the state of being maintained parallel to the electrode plates. One end of a laminate sheet 161, which will be a cell case, is fixed between a lead body 121 and the second lead end 131. The opposite end of the laminate sheet 161, which is fixed after the laminate sheet 161 wraps the outer surface of the electrode assembly, is fixed between the electrode assembly and the lead body 121. The remaining ends of the laminate sheet 161, which are not fixed, are sealed by thermal fusion to form the cell case.

Figure 4:
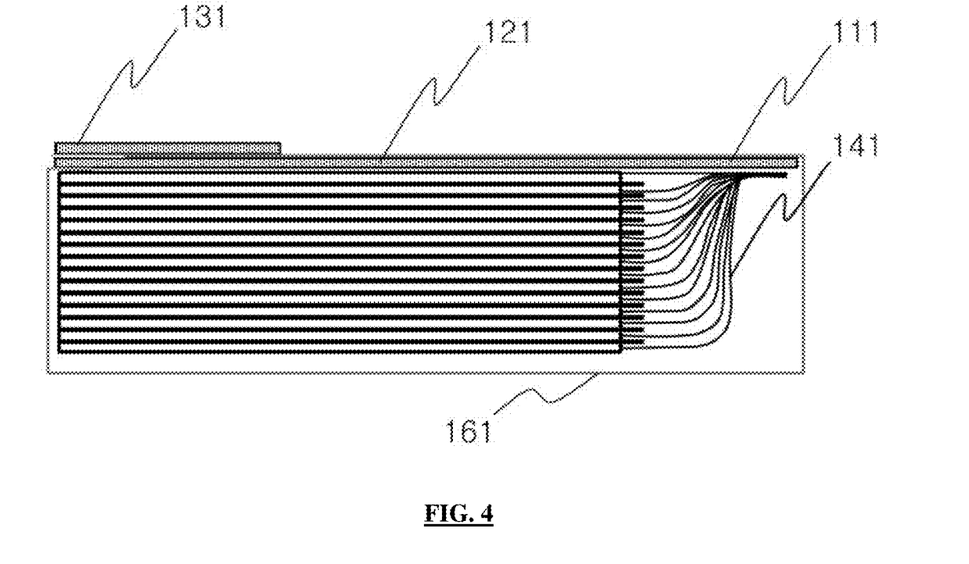
FIG. 4 is a sectional view showing a battery cell configured such that an electrode lead is located so as to face the outer surface of an electrode assembly according to another embodiment of the present invention.

FIG. 4 is a sectional view showing a battery cell configured such that an electrode lead is located so as to face the outer surface of an electrode assembly according to another embodiment of the present invention.

Referring to FIG. 4, there is shown a battery cell configured such that an auxiliary lead, which forms a second lead end 131, is coupled to a lead body 121, unlike the battery cell of FIG. 3, which is configured such that a single electrode lead is bent to form the second lead end 131. The auxiliary lead is also located on the outer surface of a cell case so as to be parallel to the direction in which electrode plates are stacked. The auxiliary lead may be coupled to the lead body 121 by welding. Since the auxiliary lead is coupled to the lead body 121 to form the second lead end 131, as described above, one end of a laminate sheet 161 is fixed between the lead body 121 and the second lead end 131.

Figure 5:
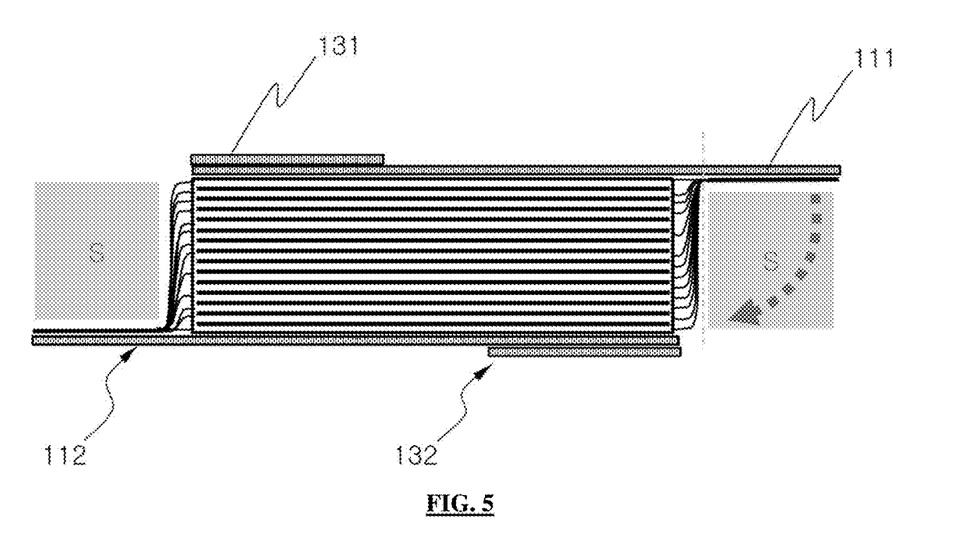
FIG. 5 is a sectional view showing a structure in which a positive electrode lead and a negative electrode lead are stacked on the outermost surfaces of an electrode assembly.
Figure 6:
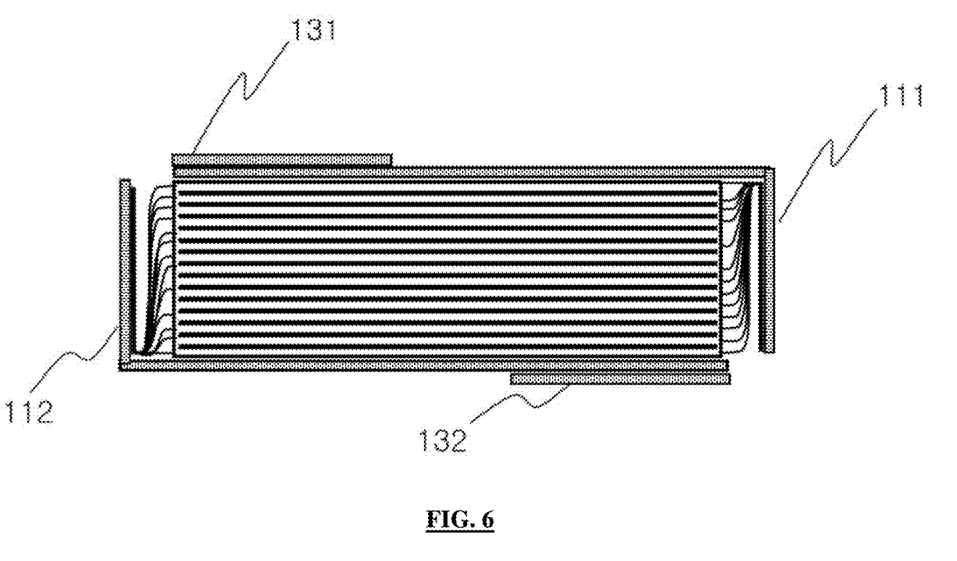
FIG. 6 is a sectional view showing a structure in which a first lead end of the positive electrode lead and a first lead end of the negative electrode lead are bent vertically at an angle of 90 degrees so as to face the side surfaces of the electrode assembly.

FIG. 5 is a sectional view showing a structure in which a positive electrode lead and a negative electrode lead are stacked on the outermost surfaces of an electrode assembly, and FIG. 6 is a sectional view showing a structure in which a first lead end 111 of the positive electrode lead and a first lead end 112 of the negative electrode lead are bent vertically at an angle of 90 degrees so as to face the side surfaces of the electrode assembly.

Referring to FIGS. 5 and 6, the positive electrode lead and the negative electrode lead are stacked on different outermost surfaces of the electrode assembly, and positive electrode tabs and negative electrode tabs protrude outwards in opposite directions on the basis of the electrode assembly so as to be coupled to the first lead end 111 of the positive electrode lead and the first lead end 112 of the negative electrode lead, respectively. The first lead end of each of the electrode leads is bent vertically an angle of 90 degrees so as to face the side surface of the electrode assembly, whereby the size of a dead space S formed by protruding shapes of the electrode tabs and the electrode leads may be considerably reduced. As a result, it is possible to increase the ratio of the capacity of the battery cell to the volume of the battery cell.

Figures 7, 8:
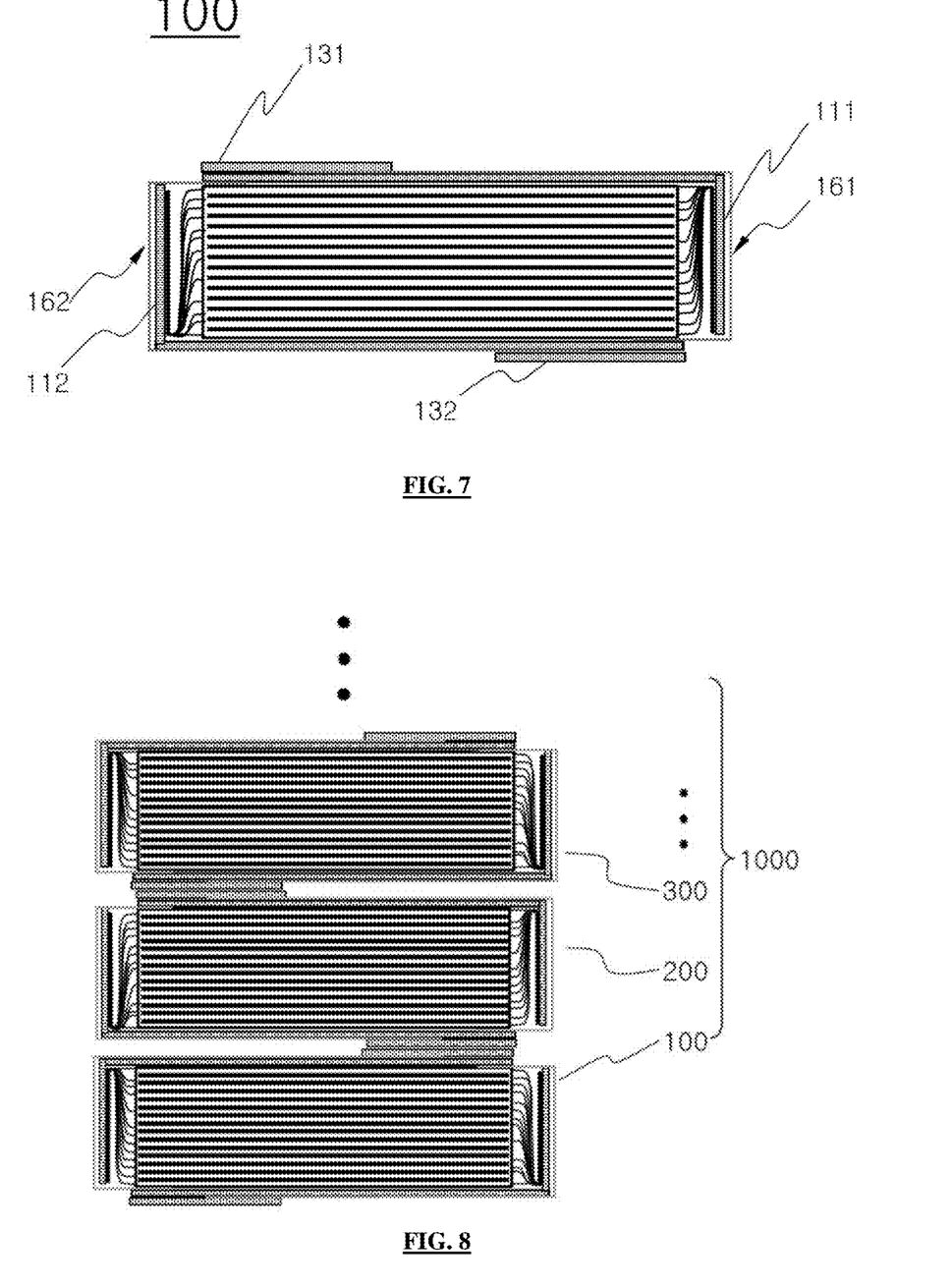
FIG. 7 is a sectional view of a battery cell configured such that a positive electrode lead and a negative electrode lead are located so as to face opposite outer surfaces of an electrode assembly according to an embodiment of the present invention.
FIG. 8 is a schematic view of a battery module including battery cells according to an embodiment of the present invention.

FIG. 7 is a sectional view of a battery cell configured such that a positive electrode lead and a negative electrode lead are located so as to face opposite outer surfaces of an electrode assembly according to an embodiment of the present invention.

Referring to FIG. 7, there is shown a battery cell according to the present invention. The battery cell includes a positive electrode lead and a negative electrode lead, which are located on the outermost surfaces of an electrode assembly so as to be parallel to electrode plates of the electrode assembly, and two laminate sheets 161 and 162. The laminate sheet 161 does not wrap the front surface of the electrode assembly. One end of the laminate sheet 161 is fixed by a lead body and a second lead end 131 of the positive electrode lead, and an opposite end of the laminate sheet 161 is fixed by the electrode assembly and a lead body of the negative electrode lead. In the same manner, one end of the laminate sheet 162 is fixed by a lead body and a second lead end 132 of the negative electrode lead, and an opposite end of the laminate sheet 162 is fixed by the electrode assembly and a lead body of the positive electrode lead. The remaining ends of the laminate sheets 161 and 162, which are fixed, are thermally fused in order to seal the electrode assembly, whereby a cell case is manufactured.

FIG. 8 is a schematic view of a battery module including battery cells according to an embodiment of the present invention.

Referring to FIG. 8, there is shown a battery module 1000 configured to have a structure in which battery cells 100, 200, and 300 according to the present invention are arranged in a stacked state such that the outer surfaces of adjacent cell cases of the battery cells, on which electrode leads of the battery cells are located, face each other, whereby the electrode leads, which are exposed on the outer surfaces of the cell cases, contact each other such that the battery cells are electrically connected to each other. The state in which the electrode leads are in contact with each other is maintained due to the weight of the stacked battery cells. Furthermore, in the case in which a case of the battery module is manufactured so as to have a shape corresponding to the stacked structure of the battery cells, the movement of the battery cells is prevented, whereby the state in which the electrode leads are in contact with each other is maintained. Consequently, it is not necessary to perform a process of coupling the electrode leads of the battery cells to each other by welding.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery cell according to the present invention is configured such that the electrode lead is located on the surface of the electrode assembly. Consequently, the size of the unnecessary dead space that is occupied by the tab-lead coupling portion and the electrode lead is reduced, whereby the energy density of the battery cell is increased. Consequently, it is possible to improve the utilization of the inner space of a device in which the battery cell is mounted.

In addition, the battery module including the battery cells according to the present invention is configured such that the battery cells physically contact each other in a non-welding fashion. Consequently, it is possible to simplify the process of manufacturing the battery module and to reduce the cost of manufacturing the battery module.

The invention claimed is:

1. A battery cell comprising:
   an electrode assembly including a positive electrode and a negative electrode stacked in a state in which a separator is interposed between the positive electrode and the negative electrode;
   a pouch-shaped cell case in which the electrode assembly is mounted, wherein the cell case is made of a laminate sheet comprising a metal layer and a resin layer;
   electrode tabs protruding outwards from a plurality of electrode plates;
   an electrode lead having a first lead end coupled to the electrode tabs, a second lead end along a surface of the electrode assembly opposite to the first lead end, and a lead body provided between the first lead end and the second lead end, the lead body facing an outermost surface of the electrode assembly,
   wherein a first end of the laminate sheet is interposed and fixed between the outermost surface of the electrode assembly and the lead body, an opposite second end of the laminate sheet is interposed and fixed between the lead body and the second lead end which is located on an outer surface of the cell case, wherein the second lead end and the lead body are both parallel to the electrode plates, whereby the laminate sheet wraps the electrode assembly, and
   wherein an outer edge of the cell case is sealed by thermal fusion,
   wherein the first lead end is coupled to the electrode tabs of the electrode assembly so as not to exceed ends of the electrode tabs, the lead body extended continuously from the first lead end is located inside the battery cell and further extends so as to reach to an opposite end of the electrode assembly in a direction opposite to a direction in which the electrode tabs protrude, and the second lead end is coupled to the lead body at an opposite position to the first lead end.

2. The battery cell according to claim 1, wherein the separator is interposed between the lead body and the outermost surface of the electrode assembly.

3. The battery cell according to claim 1, wherein the electrode lead is configured such that,
   in a state in which the second lead end, the lead body, and the first lead end are arranged so as to be sequentially located in a state of being parallel to a direction in which the electrode tabs protrude outwards, the first lead end is coupled to the electrode tabs, and
a portion of the lead body is bent at an angle of 180 degrees with respect to a remaining portion of the lead body such that the second lead end is located on the outer surface of the cell case.

4. The battery cell according to claim 1, wherein the electrode lead is configured such that,
in a state in which the lead body and the first lead end are arranged so as to be sequentially located in a state of being parallel to a direction in which the electrode tabs protrude outwards,
the first lead end is coupled to the electrode tabs, and
an auxiliary lead, which forms the second lead end, is further coupled to the lead body.

5. The battery cell according to claim 4, wherein the auxiliary lead is welded to the lead body.

6. The battery cell according to claim 1, wherein a coupling portion of the electrode tabs and the first lead end is bent at an angle of 90 degrees with respect to the lead body so as to face a side surface of the electrode assembly.

7. The battery cell according to claim 6, further comprising a protective member disposed between the bent coupling portion of the electrode tabs and the side surface of the electrode assembly.

8. The battery cell according to claim 1, wherein a size of the second lead end is equivalent to 10% to 95% of a planar size of the outer surface of the cell case on which the second lead end is located.

9. The battery cell according to claim 1, wherein
the electrode tabs include positive electrode tabs protruding outwards in a first direction and negative electrode tabs protruding outwards in a second direction, which is opposite the first direction,
the electrode lead is a positive electrode lead coupled to the positive electrode tabs, the outer surface of the cell case being a first outer surface on which the second lead end is located, and
a second lead end of a negative electrode lead coupled to the negative electrode tabs is located on a second outer surface of the cell case, which is opposite the first outer surface.

10. The battery cell according to claim 1, wherein remaining ends of the laminate sheet not fixed by the electrode lead are sealed by thermal fusion to form the cell case.

11. A battery module comprising two or more battery cells according to claim 1.

12. The battery module according to claim 11, wherein the battery cells are arranged in a stacked state so as to have a structure in which outer surfaces of respective cell cases are adjacent and, on which respective electrode leads of the battery cells are located, face each other.

13. The battery module according to claim 12, wherein the battery cells, which are arranged in the stacked state, physically contact each other in a non-welding fashion.

14. A battery cell comprising:
an electrode assembly including a positive electrode and a negative electrode stacked in a state in which a separator is interposed between the positive electrode and the negative electrode;
a pouch-shaped cell case in which the electrode assembly is mounted, wherein the cell case is made of a laminate sheet comprising a metal layer and a resin layer;
electrode tabs protruding outwards from a plurality of electrode plates;
an electrode lead having a first lead end coupled to the electrode tabs, a second lead end opposite to the first lead end, and a lead body provided between the first lead end and the second lead end, the lead body facing an outermost surface of the electrode assembly,
wherein a first end of the laminate sheet is interposed and fixed between the outermost surface of the electrode assembly and the lead body, an opposite second end of the laminate sheet is interposed and fixed between the lead body and the second lead end which is located on an outer surface of the cell case, wherein the second lead end and the lead body are both parallel to the electrode plates, whereby the laminate sheet wraps the electrode assembly, and
wherein an outer edge of the cell case is sealed by thermal fusion,
wherein the electrode tabs include positive electrode tabs protruding outwards in a first direction and negative electrode tabs protruding outwards in a second direction, which is opposite the first direction,
wherein the electrode lead is a positive electrode lead coupled to the positive electrode tabs, the outer surface of the cell case being a first outer surface on which the second lead end is located, and
wherein a second lead end of a negative electrode lead coupled to the negative electrode tabs is located on a second outer surface of the cell case, which is opposite the first outer surface.
wherein the positive electrode lead is configured such that,
in a state in which the second lead end of the positive electrode lead, the lead body of the positive electrode lead, and the first lead end of the positive electrode lead are arranged so as to be sequentially located in a state of being parallel to a direction in which the positive electrode tabs protrude outwards,
the first lead end of the positive electrode lead is coupled to the positive electrode tabs, and
a portion of the lead body of the positive electrode lead is bent at an angle of 180 degrees with respect to a remaining portion of the lead body of the positive electrode lead such that the second lead end of the positive electrode lead is located on the first outer surface of the cell case;
wherein a coupling portion of the positive electrode tabs and the first lead end of the positive electrode lead is bent at an angle of 90 degrees with respect to the lead body of the positive electrode lead so as to face a side surface of the electrode assembly;
wherein the negative electrode lead is configured such that,
in a state in which a second lead end of the negative electrode lead, the lead body of the negative electrode lead, and a first lead end of the negative electrode lead are arranged so as to be sequentially located in a state of being parallel to a direction in which the negative electrode tabs protrude outwards,
the first lead end of the negative electrode lead is coupled to the negative electrode tabs, and
a portion of the lead body of the negative electrode lead is bent at an angle of 180 degrees with respect to a remaining portion of the lead body of the negative electrode lead such that the second lead end of the negative electrode lead is located on the second outer surface of the cell case; and
wherein a coupling portion of the negative electrode tabs and the first lead end of the negative electrode lead is bent at an angle of 90 degrees with respect to the lead body of the negative electrode lead so as to face a side surface of the electrode assembly.

* * * * *